(12) United States Patent
Harmison et al.

(10) Patent No.: US 6,353,777 B1
(45) Date of Patent: Mar. 5, 2002

(54) PATH CORRECTION FOR LANE CHANGE ANALYSIS

(75) Inventors: David Wayne Harmison, Livonia; James Christopher Metzger, Canton; Jerry Alan Holmes, Liviona; Kenneth James Boyd, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 22 days.

(21) Appl. No.: 09/639,570

(22) Filed: Aug. 16, 2000

(51) Int. Cl.⁷ .................................................. G06F 7/00
(52) U.S. Cl. ............................. 701/1; 701/37; 180/41; 280/5.5
(58) Field of Search .................... 701/1, 37; 180/41; 280/5.5

(56) References Cited

U.S. PATENT DOCUMENTS

| | | |
|---|---|---|
| 3,582,632 A * | 6/1971 | Foster .................. 235/151.32 |
| 4,241,403 A | 12/1980 | Schultz |
| 4,500,868 A | 2/1985 | Tokitsu et al. |
| 4,671,111 A | 6/1987 | Lemelson |
| 4,969,212 A | 11/1990 | Walter |
| 5,173,856 A | 12/1992 | Purnell et al. |
| 5,530,648 A * | 6/1996 | Lavey .................. 364/424.05 |
| 5,557,520 A | 9/1996 | Suissa et al. |
| 5,627,768 A | 5/1997 | Uhlmann et al. |
| 5,782,543 A | 7/1998 | Monzaki et al. |
| 5,809,434 A | 9/1998 | Ashrafi et al. |
| 5,815,070 A | 9/1998 | Yoshikawa |
| 5,864,768 A | 1/1999 | Bieber et al. |
| 5,877,414 A | 3/1999 | Rui et al. |
| 5,933,352 A | 8/1999 | Salut |

* cited by examiner

Primary Examiner—Yonel Beaulieu
(74) Attorney, Agent, or Firm—Gregory P. Brown

(57) ABSTRACT

A vehicle response apparatus has a sensor 24 coupled to a training classifier 14 that is used to determine a vehicle response using a standard path. The trained classifier 14 is trained to have a frequency response so that as data from a driven path is input to the classifier 14, classifier 14 generates data as if the path was the standard path.

21 Claims, 2 Drawing Sheets

PATH CORRECTION FOR LANE CHANGE ANALYSIS

TECHNICAL FIELD

The present invention relates generally to test procedures for testing the responses of an automotive vehicle, and more specifically, to an apparatus and method for determining a response to driver actions along a corrected path.

BACKGROUND

In the development of automotive vehicles, and particularly various dynamic aspects of the automotive vehicle such as handling and response, a particular driver obtains a subjective analysis when performing certain maneuvers. Each driver performs a different event differently. That is, even though a course may be laid out with cones for a particular handling event, various driver paths within the cones may alter the characteristics of the vehicle. It has been found that the variability in driving style is often very large and may make it difficult to distinguish various drive and handling characteristics of the driven vehicles.

It would therefore be desirable to obtain an objective measure for a handling event as if the driver has consistently followed the exact same path to remove the variability.

SUMMARY OF THE INVENTION

It is therefore one object of the invention to provide path correction analysis to remove the variability caused by different driving styles and driver inconsistency by predicting the response as if the driver had followed a predetermined course exactly.

In one aspect of the invention, a method of determining a vehicle response comprises the steps of:

training a translator by inputting vehicle properties;

determining a standard path; and, determining a vehicle response as a function of said translator and said standard path.

In a further aspect of the invention, a vehicle response apparatus includes a sensor having a sensor output corresponding to a travel path of the vehicle. A trained classifier has a response function program therein and a standard path input coupled to the sensor. The response function corresponds to a standard path of the vehicle. The classifier has an output corresponding to a vehicle response through a standard path as a function of the response function and the sensor output.

One advantage of the invention is that various vehicle dynamic situations including yawing and rollover may be determined using the standard path correction of the present invention.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
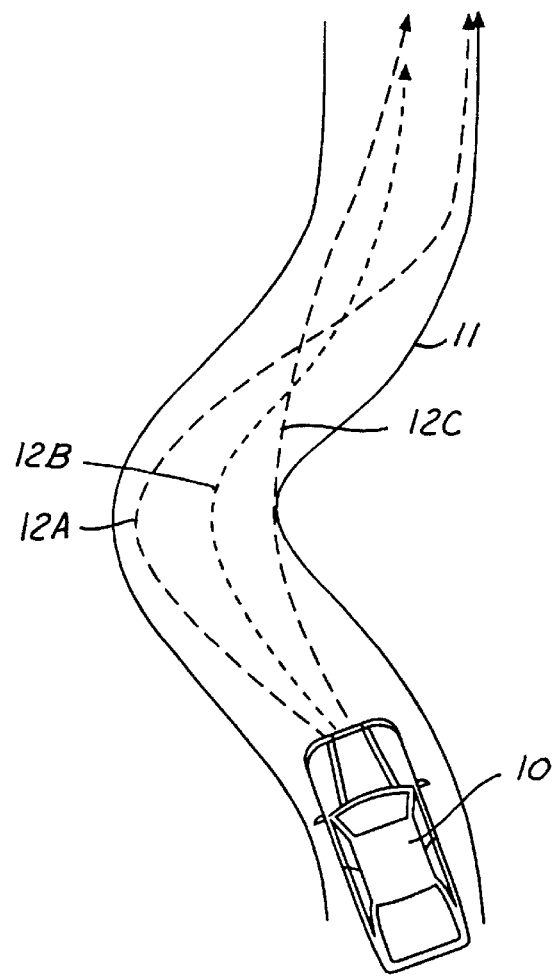
FIG. 1 is a diagrammatic view of an automotive vehicle on a road with several paths thereon.

In the following figures the same reference numerals will be used to identify the same components in the various views. In the following examples, specific sensors are used to illustrate the application of inputs to the system. However, those skilled in the art will recognize various types of sensors and combinations of sensors may be used depending on the particular parameters to be measured.

Referring now to FIG. 1, a vehicle 10 is illustrated on a road 11. A plurality of paths 12A, 12B and 12C illustrate various paths along road 11. As is shown by the contrast between path 12A and 12C, the operator may take various paths. Path 12B is meant to represent a standard path along road 11.

In an engineering analysis of the automotive vehicle, the various driven paths may be corrected to determine the vehicle response using standard path 12B as will be described below. By using the standard predetermined path the subjectivity of the particular run is removed.

Figure 2:
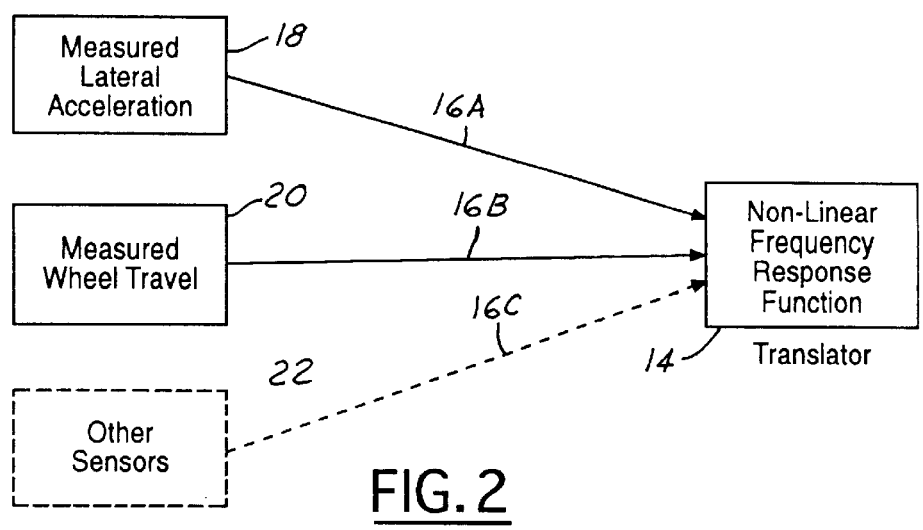
FIG. 2 is a high level block diagrammatic view of a training device for a translator according to the present invention.

Referring now to FIG. 2, to perform path correction analysis, a translator 14 having a predetermined response function is used. Prior to use, the translator 14 must be trained to have the response function that will allow path correction on various inputs from driven paths. Translator 14 is preferably implemented in a microprocessor-based computing device such as a personal computer. The response function may be implemented in various ways including in software. Translator 14 is illustrated having inputs 16A, 16B and 16C coupled respectively to a lateral acceleration sensor 18, a measured wheel travel sensor 20, and other sensors 22. Each sensor 18, 20, 22 may be the actual sensor or recorded data from a traveled path from a test run. Preferably in a training exercise, several runs of a specific path will be used in the training process. Measured wheel travel 20 is the distance, preferably from each wheel, that the wheels travel during a test run.

Other sensors 22 may also be used including various types of sensors such as yaw sensors, height sensors, or various other sensors used to determine various dynamic situations of the vehicle. Although two specific and one general representation of sensors is illustrated, various combinations or a single sensor may be used to train classifier 14. The sensor set used is dependent on the particular vehicle characteristics of interest.

By using the sensor data, a frequency response function for a particular path is generated. The frequency response function is a mathematical representation of how the vehicle responds depending on driver input. Even though the data from the individual runs or drivers varies considerably, the frequency response function does not. That is, the frequency response function is a property of the vehicle. Preferably, the frequency response function is a non-linear frequency response function. A suitable frequency response function may be developed by those skilled in the art using the ITAP-P program by Measuring Analysis Corp. and suitable test data derived from the sensors 20, 22 above. Of course, those skilled in the art will also recognize that a linear frequency response function may be used.

Figure 3:
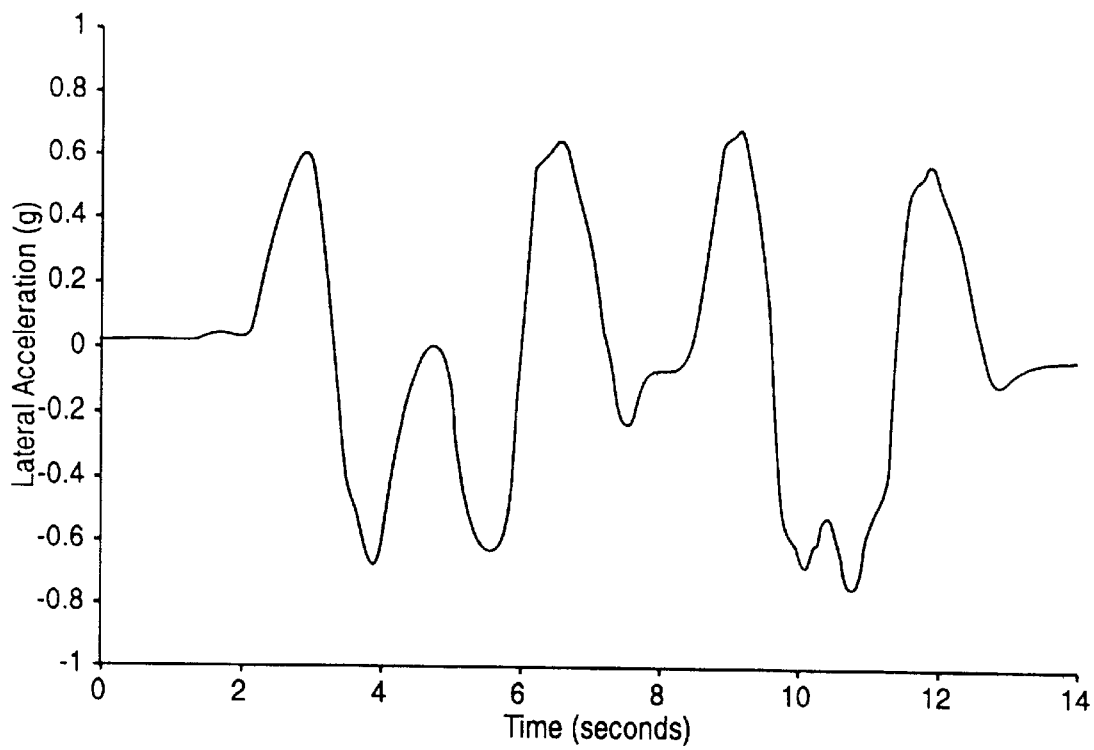
FIG. 3 is a plot of letter acceleration versus time as measured from a sensor to be input to the system according to the present invention.

Referring now to FIG. 3, a lateral acceleration measurement from a lateral acceleration is plotted with respect to time for a traveled path.

Figure 4:
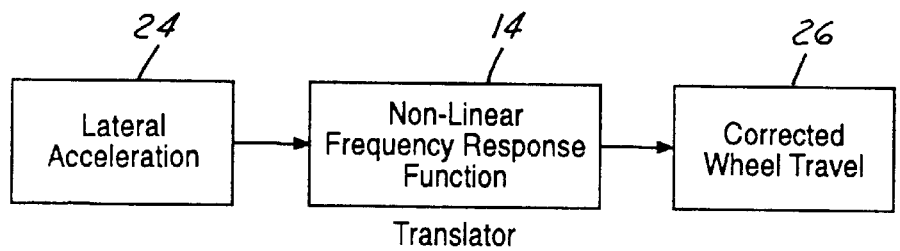
FIG. 4 is a plot of a path correction system according to the present invention.

Referring now to FIG. 4, the lateral acceleration path of FIG. 2 is used as an input 24 to translator 14. Of course, the other sensors may be provided as input 24. Also, translator 14 may have more than one input to allow various sensor data to be input to translator 14.

Translator 14 has an output 26 that corresponds to a corrected wheel travel for a standard path. The input 24 for a traveled path is translated in translator 14 to a corrected wheel travel for a standard path 26.

Figure 5:
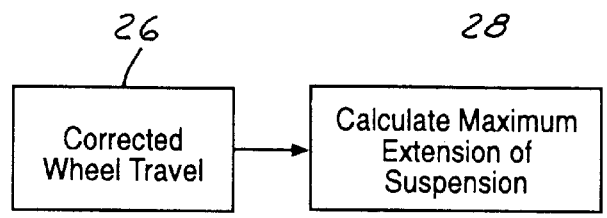
FIG. 5 is a block diagrammatic view of a performance metric system according to the present invention.

Referring now to FIG. 5, the corrected wheel travel of output 26 may be used to provide or derive various vehicle characteristics such as calculating maximum extension of a suspension in block 28. Of course, those skilled in the art will recognize various other types of information may be calculated depending on the type of vehicle and the particular requirements of the development engineers.

Advantageously, the present invention will provide a tool to the design engineers to allow them to test various vehicle configurations and obtain consistent data as if the vehicle had taken a standard path. The various paths suitable for testing may vary depending on the response to be tested. For example, a one lane shift path or a one lane shift and return path may be used.

In operation, the translator 14 must be first trained using various sensor outputs of a vehicle during various traveled paths. The train classifier has a frequency response function in response to the sensor output of the traveled paths and a response function is stored therein. When subsequent data is applied to the translator for a specific path, the translator may translate the sensor data to standard path data and a vehicle response may be determined in response to the response function and the sensor data. Vehicle performance metrics such as extension of suspension, roll or other dynamic situations may be determined from the output of the translator that correspond to a standard path.

While particular embodiments of the invention have been shown and described, numerous variations alternate embodiments will occur to those skilled in the art. Accordingly, it is intended that the invention be limited only in terms of the appended claims.

What is claimed is:

1. A method of determining a vehicle response comprising the steps of:

training a translator by inputting vehicle properties;

determining a standard path; and, determining the vehicle response as a function of said translator and said standard path.

2. A method as recited in claim 1 wherein said step of determining the vehicle response comprises the steps of determining a corrected wheel travel as a function of said translator and said standard path.

3. A method as recited in claim 2 wherein said step of determining the vehicle response comprises calculating a maximum extension of a vehicle suspension.

4. A method as recited in claim 1 wherein said step of training comprises performing a plurality of test runs and recording driver inputs and said vehicle response thereto.

5. A method as recited in claim 1 further comprising calculating performance metrics according to said vehicle response.

6. A method as recited in claim 1 wherein said translator has a non-linear frequency response function.

7. A method as recited in claim 1 wherein said translator has a linear frequency response function.

8. A response apparatus for a vehicle comprising:

a sensor having a sensor output corresponding to a traveled path of the vehicle; and, a training classifier having a response function program therein and a standard path input coupled to the sensor, said response function corresponding to a standard path, said classifier having an output corresponding to a vehicle response through a standard path as a function of said response function and said sensor output.

9. An apparatus as recited in claim 8 wherein said training classifier has a non-linear frequency response function.

10. An apparatus as recited in claim 8 wherein said training classifier has a linear frequency response function.

11. An apparatus as recited in claim 8 wherein said sensor comprises a lateral acceleration sensor.

12. An apparatus as recited in claim 8 further comprising a second sensor.

13. An apparatus as recited in claim 12 wherein said second sensor comprises a measured wheel travel sensor.

14. An apparatus as recited in claim 8 wherein said trained classifier calculates performance metrics according to said vehicle response.

15. A method of determining a vehicle response of a vehicle comprising the steps of:

applying sensor data to a translator having a response function therein;

translating the sensor data to standard path data in the translator; and, determining the vehicle response as a function of said response function and said sensor data.

16. A method as recited in claim 15 wherein said response function is a frequency response function.

17. A method as recited in claim 16 wherein said frequency response function comprises a non-linear frequency response function.

18. A method as recited in claim 16 wherein said frequency response function comprises a linear response function.

19. A method as recited in claim 15 further comprising the step of training a translator by inputting test sensor data.

20. A method as recited in claim 15 wherein said step of determining a vehicle response comprises the steps of determining a corrected wheel travel as a function of said translator and said standard path.

21. A method as recited in claim 19 wherein said step of determining a vehicle response comprises calculating a maximum extension of a vehicle suspension.

* * * * *